July 26, 1932.    P. T. BLACK ET AL    1,868,594
DRIVE CONNECTION
Filed Aug. 28, 1931
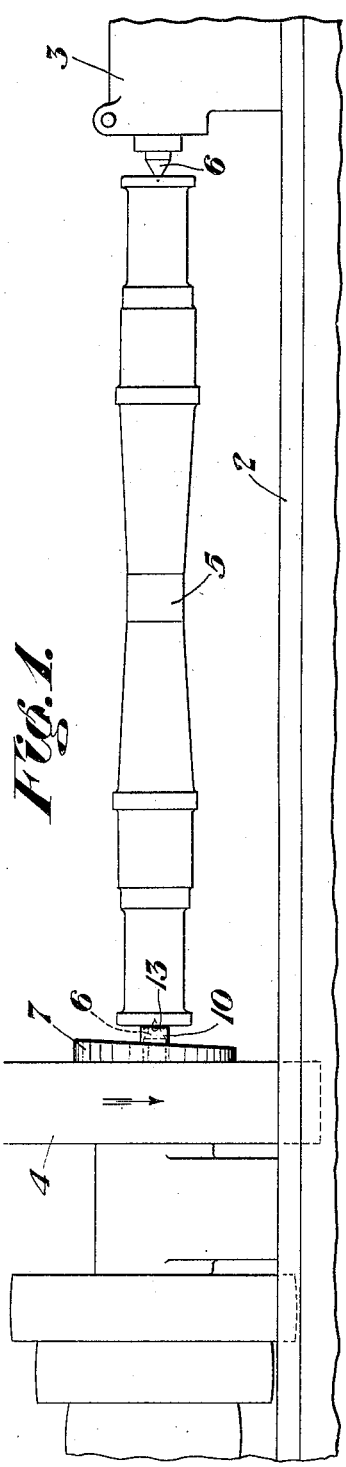
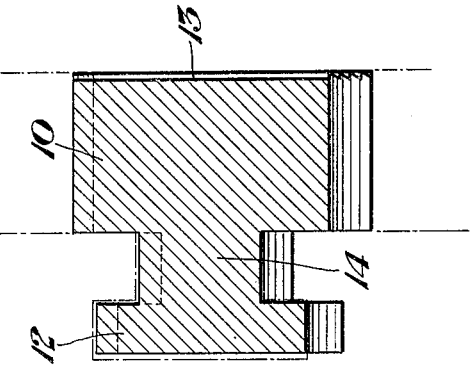
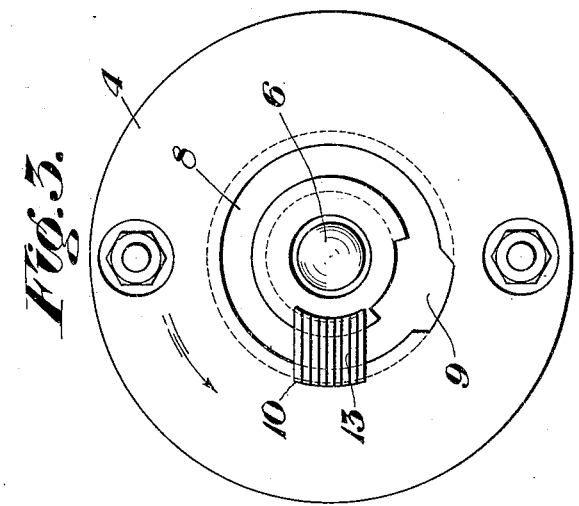
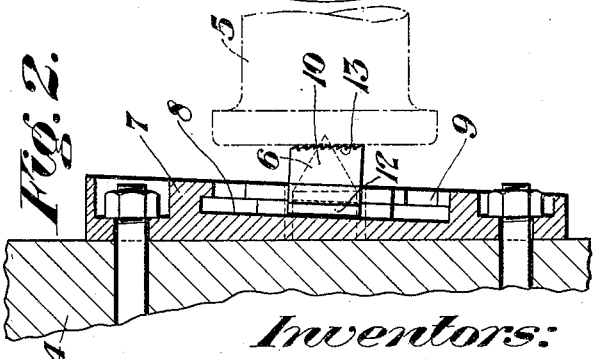
Inventors:
PAUL T. BLACK and
WILLIAM P. BOETTNER.
by: Usina & Rauber
their Attorneys.

Patented July 26, 1932

1,868,594

UNITED STATES PATENT OFFICE

PAUL T. BLACK, OF DORMONT, AND WILLIAM P. BOETTNER, OF McKEES ROCKS, PENNSYLVANIA

DRIVE CONNECTION

Application filed August 28, 1931. Serial No. 560,004.

This invention relates to a work turning device for use in lathes and the like, one of the objects being to provide a means for rotating the work without the use of a dog or other usual devices, for gripping the periphery of the work, which prevents any working on this part. Such a means is desirable because it obviates the need of reversing the work in order to fully complete the turning operation, this now being general practice which naturally results in loss of time.

Other objects may later become apparent.

In the drawing:

Figure 1 shows a side view of an example of this invention as it appears in use.

Figure 2 is an enlarged cross-sectional view of the example shown in Figure 1.

Figure 3 is an end view thereof.

Figure 4 is an enlarged cross-sectional view of a detail of this invention.

Having reference to this drawing, there is shown a portion of a lathe 2 having a tailpiece 3 and a driving face-plate 4 for rotating the work 5. This work is mounted for free rotation on the center points 6. A circular plate 7 is bolted to the driving face-plate 4 and has a flanged circular recessed bearing surface 8 with a section of the flanged portion thereof enlarged to the full width of this bearing surface to form an opening 9. This plate member 7 has its opposite faces at an angle to each other, so that when it is bolted to the driving face-plate 4 its outer face and the recessed bearing surface 8 will be at an angle to the end face of the work 5, it being bolted in such a position that the opening 9 is at a point most remote from the work. A work engaging member 10, having a smooth inner end 12 and a roughened outer end 13 with a reduced portion 14 therebetween is arranged on the bearing surface 8 with its smooth end 12 under the flanged portion thereof for sliding carriage thereon. This member 10 may be positioned and removed through the opening 9.

In use, the work 5 is positioned between the center points 6 and the face-plate 4 is rotated, the operator of the lathe holding the member 6 against rotation so that it rides upon the bearing surface 8 and into engagement with the end face of the work 5. Further rotation of the face-plate 4 serves to force this member 10 into firmer engagement with the work so that a positive drive is assured. The workman is able to turn the work from one end to the other without the need of taking time to reverse the work in the lathe, as is necessary when dogs, chucks or other such devices are used. It may be readily seen that a great saving in time is thus effected while, because of the fact that the workman need not reset his working tool, greater accuracy results.

We claim:

A work turning device comprising a body arranged at an angle to the end face of the work to be turned and having a flanged circular recessed bearing surface with a section of the flanged portion thereof enlarged to the full width of this bearing surface at a point most remote from the end face of the work, and a member having a smooth end and a roughened end with a reduced portion therebetween the smooth end thereof being insertable through the enlarged section of the flanged portion of said recessed bearing surface for sliding carriage on the latter.

In testimony whereof, we have hereunto set our hands.

PAUL T. BLACK.
WILLIAM P. BOETTNER.